Feb. 12, 1929.  E. TREECE  1,702,065
TRANSMISSION
Filed June 18, 1927   3 Sheets-Sheet 2
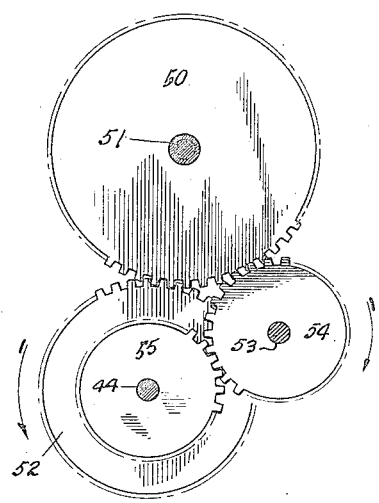
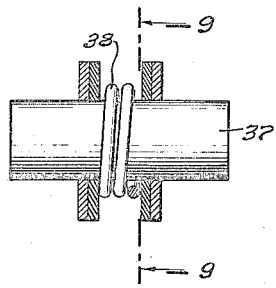
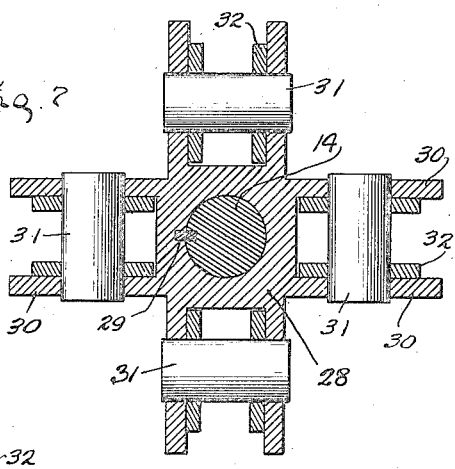
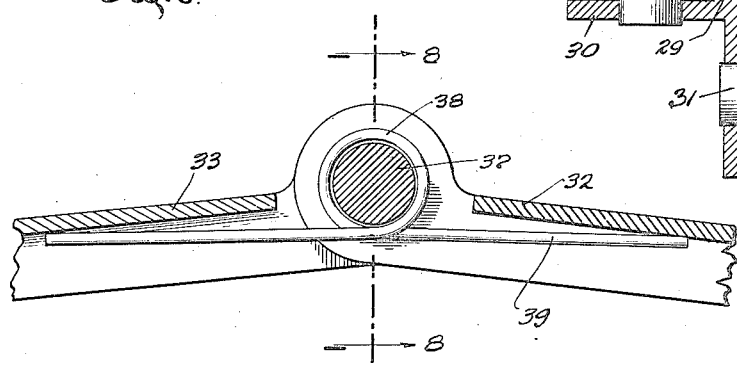
Inventor
Ezra Treece
By Joshua R H Potts
his Attorney

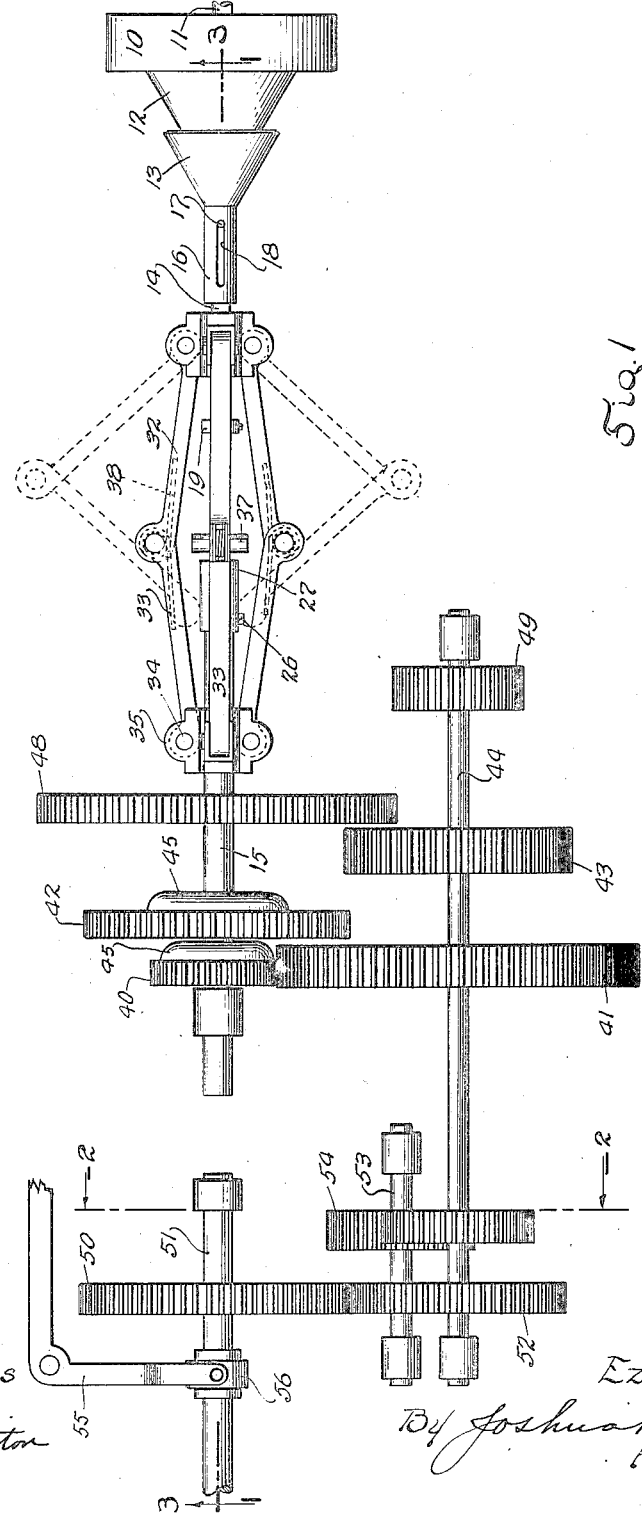

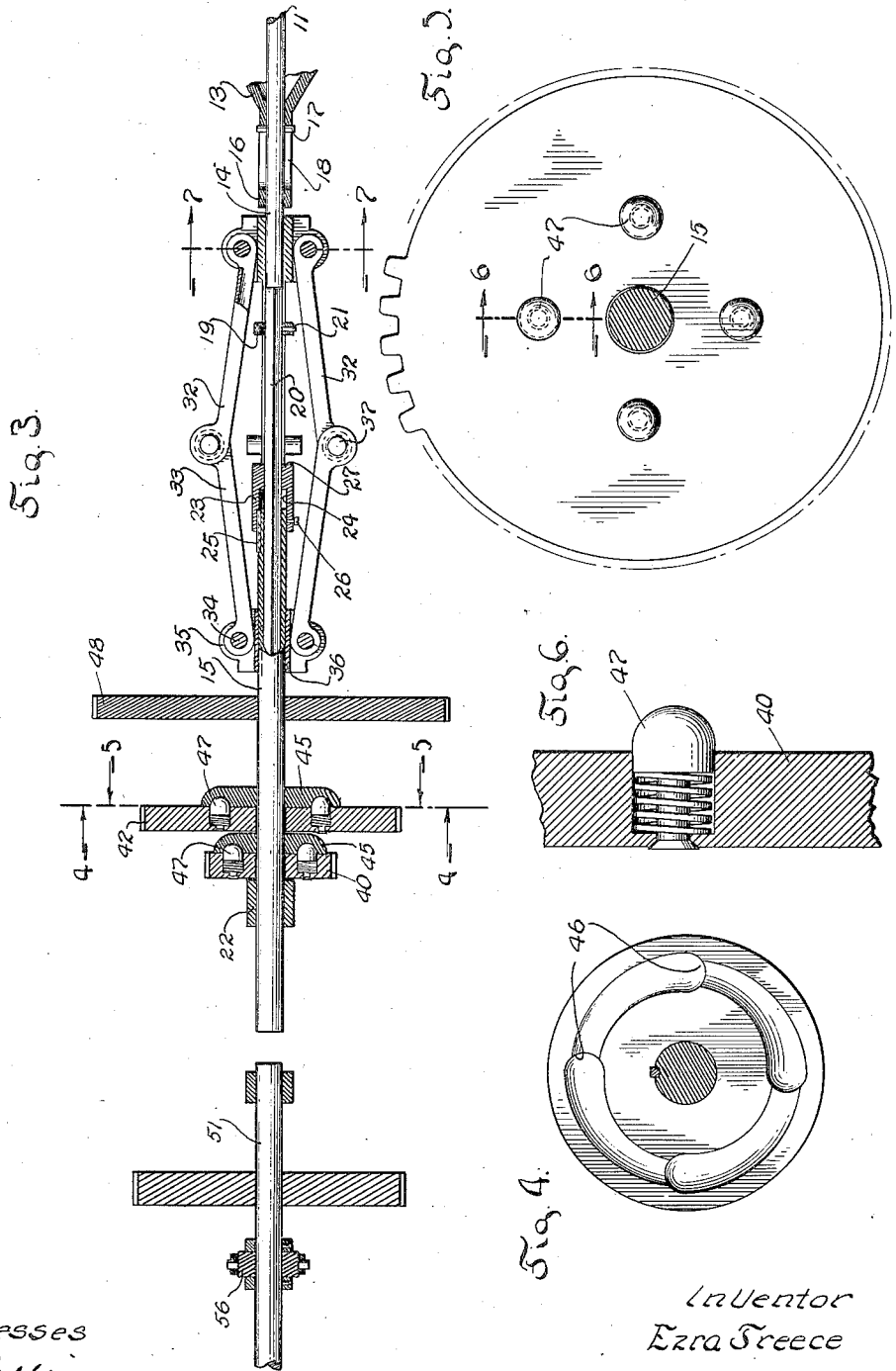

Patented Feb. 12, 1929.

1,702,065

UNITED STATES PATENT OFFICE.

EZRA TREECE, OF CHICAGO, ILLINOIS.

TRANSMISSION.

Application filed June 18, 1927. Serial No. 199,676.

My invention relates to a transmission and, more particularly, to a gear transmission especially adapted for use in automobiles and the like, and the object of my invention is to provide such a transmission which comprises automatic means for shifting gears depending upon the speed of rotation of the drive shaft. Another object of my invention is to provide such a transmission having the gears so arranged and having some of them provided with ratchet means for allowing them to rotate relative to the drive shaft in one direction and having the gears so spaced that one or more of the gears on the drive shaft is at all times in mesh with one or more gears on the countershaft.

In the accompanying drawings

Figure 1 is an elevational view of a gear transmission incorporating my invention.

Figure 2 is an end view, partly in section, taken on the line 2—2 of Figure 1.

Figure 3 is a sectional view taken on the line 3—3 of Figure 1.

Figure 4 is a sectional view taken on the line 4—4 of Figure 3.

Figure 5 is a sectional view taken on the line 5—5 of Figure 3.

Figure 6 is a sectional view taken on the line 6—6 of Figure 5.

Figure 7 is a sectional view taken on substantially the line 7—7 of Figure 3.

Figure 8 is a sectional view taken on substantially the line 8—8 of Figure 9.

Figure 9 is a sectional view taken on the line 9—9 of Figure 8.

In the drawings and for the purpose of illustration, I have shown the preferred embodiment of my invention, in which 10 represents a balance wheel of an automobile engine mounted on the crank shaft 11 and having secured thereto one member 12 of a clutch adapted to engage and cooperate with the other member 13 of said clutch, which is mounted on one member 14, of the drive shaft which is composed of two telescoping members 14 and 15. The clutch member 13 is provided with a cylindrical collar 16 which is adapted to slide longitudinally of the drive shaft and is secured from rotation relative thereto by means of the pin 17 positioned in the slot 18, as best shown in Figure 1. The clutch member 13 may be operated in any usual and suitable manner.

The collar 19 is adjustably secured from longitudinal movement of the squared portion 20 of the member 14 by means of a set screw 21. The member 15 of the drive shaft is in the form of a hollow cylinder and is mounted for rotation in a bearing 22 and is adapted to receive the squared portion 20 of the member 14 into one end thereof. A cylindrical member 23 is provided with a cylindrical bore 24 in one end thereof and is adapted to fit over one end of the member 15, as shown in Figure 3, and is secured from rotation relative thereto by means of a feather key 25. Said member 23 is adjustably secured from longitudinal movement relative to said member 15 by means of a suitable set screw 26. The end 27 of said cylindrical member 23 is provided with a square opening therein, through which the squared portion 20 of the member 14 is adapted to snugly fit and through which said portion 20 is adapted to reciprocate for the purpose of allowing the members 14 and 15 to telescope.

A square collar 28 is mounted on the member 14 and is secured from movement relative thereto by means of a key 29, as shown in Figure 7. Said collar 28 is provided with a plurality of fins 30 having cylindrical openings therein and pins 31 secured within said openings and providing pivots for the arms 32, which are pivotally secured to similar arms 33, which are, in turn, pivoted on pins 34 secured in fins 35 of the square collar 36, which is suitably secured from movement relative to the member 15. The pins 37 on which the arms 32 and 33 are pivoted, extend a short distance laterally of said arms and thereby provide sufficient weight for the operation of the member 15 longitudinally with respect to the member 14 by means of centrifugal force caused by the rotation of the drive shaft. Coil springs 38 are positioned about the pins 37 and are provided with extensions 39 which engage portions on the arms 32 and 33 for normally exerting a force in such a direction as to cause said arms 32 and 33 to lie in substantially the same plane, and thereby causing the collars 28 and 36 to move the members 14 and 15 so as to extend the drive shaft.

It will be noted when the drive shaft is running at a relatively slow speed, the gear 40 will be in mesh with the gear 41, and the gear 42 will be positioned between the gears 41 and 43, and when the speed of the drive shaft is increased, the gear 42 will mesh with the gear 43 before the gear 40 becomes disengaged with the gear 41, and as the gears 41 and 43 are rigidly secured to the countershaft 44, the gear 41 will cause the gear 40 on the drive shaft to rotate at a higher speed than the rotation of the gear 42 and in order to permit said gear 40 to rotate in the direction of rotation of the drive shaft at a speed higher than the rotation of said drive shaft, I have provided a ratchet clutch means comprising a collar 45 rigidly secured to the shaft 15 and having recesses 46 in one face thereof adapted to receive a spring held plunger 47 therein. The plungers 47 are adapted to recede into the body of the gear 40 when the gear 40 is rotated at a speed higher than the rotation of the drive shaft and said plungers are adapted to engage into said recesses 46 and prevent the rotation of said gear at a speed less than that of the drive shaft or in a direction opposite to that of the drive shaft.

When the drive shaft is rotated at a relatively high speed, the gear 48—being mounted on the member 15—is caused to engage the gear 49 on the countershaft and, as previously explained in regard to gears 40 and 42, the gear 48 meshes with the gear 49 before the gear 42 becomes disengaged with the gear 43, and for allowing this operation, I have provided a ratchet clutch as hereinbefore described for the gear 40. By this arrangement, it is obvious that there is no neutral position in the automatic operation of my transmission.

For the purpose of providing a neutral position and for providing a reverse, I employ the usual type of gear-shifting means consisting of a gear 50 on the driven shaft 51 adapted to engage the gear 52 on the countershaft 44. I also provide a reverse shaft 53 having a reverse gear 54 positioned thereon and adapted to engage the gear 50 and the gear 54 on the counter shaft 44. For causing the driven shaft 51 to rotate in a reverse direction when said gear 50 is shifted longitudinally so as to engage said gear 54, in the normal operation in the forward direction of the automobile, the gear 50 is shifted by any suitable means such as the lever 55 and the collar 56 into a position to engage the gear 52 on the countershaft 44, as shown in Figure 1.

By this arrangement for automatically shifting gears, as the speed of the drive shaft increases or decreases, it is impossible to slip into a neutral position and stall the car or to clash gears on account of the great difference of the speed of rotation because a large number of gears similar to 40 and 42 may be positioned on the drive shaft and a correspondingly large number of cooperating gears may be positioned on the countershaft 44 and, being of gradually varying sizes so that the difference of peripheral rotation of adjacent gears is relatively small, thereby preventing clashing of gears and other dangers incident to the operation of the usual type of gear shifting mechanisms.

Having described my invention in its preferred form, it is capable of variations without departing from the spirit of the invention, and I do not wish to be limited to the precise details of construction illustrated and described, but desire to avail myself of such variations and modifications as come within the scope of the appended claim.

I claim as my invention:

A transmission having in combination a drive shaft and a countershaft; said drive shaft comprising two telescoping members; a plurality of gears mounted on said drive shaft and adapted for rotation in one direction with respect to said drive shaft and adapted to engage a plurality of gears of different sizes on said countershaft at the same time; and means for telescoping said drive shaft members for shifting the gears mounted thereon; a collar on one of said telescoping means adapted to be engaged by a cylindrical member adjustably secured to the other member of said drive shaft for limiting the extent of said telescoping movement.

In testimony whereof I have signed my name to this specification.

EZRA TREECE.